United States Patent
Neumann

(10) Patent No.: US 12,238,053 B2
(45) Date of Patent: Feb. 25, 2025

(54) METHODS AND SYSTEMS FOR GENERATING A VIRTUAL ASSISTANT IN A MESSAGING USER INTERFACE

(71) Applicant: KPN INNOVATIONS, LLC., Lakewood, CO (US)

(72) Inventor: Kenneth Neumann, Lakewood, CO (US)

(73) Assignee: KPN INNOVATIONS LLC, Lakewood, CO (US)

( * ) Notice: Subject to any disclaimer, the term of this patent is extended or adjusted under 35 U.S.C. 154(b) by 8 days.

(21) Appl. No.: 18/138,522

(22) Filed: Apr. 24, 2023

(65) Prior Publication Data

US 2023/0262016 A1    Aug. 17, 2023

Related U.S. Application Data

(63) Continuation of application No. 16/912,040, filed on Jun. 25, 2020, now Pat. No. 11,665,118.

(51) Int. Cl.
*H04L 51/18* (2022.01)
*G06F 16/31* (2019.01)
(Continued)

(52) U.S. Cl.
CPC ............ *H04L 51/18* (2013.01); *G06F 16/316* (2019.01); *G06N 3/006* (2013.01); *H04L 51/02* (2013.01); *H04L 51/046* (2013.01)

(58) Field of Classification Search
CPC ....... H04L 51/18; H04L 51/02; H04L 51/046; G06F 16/316; G06N 3/006; G06N 5/01; G06N 7/01; G06N 20/20
See application file for complete search history.

(56) References Cited

U.S. PATENT DOCUMENTS 7,958,066 B2   6/2011   Pinckney et al.
9,201,865 B2   12/2015  Tran
(Continued)

FOREIGN PATENT DOCUMENTS

WO   2019104411   6/2019

OTHER PUBLICATIONS

Fadhil, Ahmed, Intelligent Conversational Agent Assisted Health Coaching System: The CoachAI Approach, Dec. 31, 2018.
(Continued)

*Primary Examiner* — Soe Hlaing
(74) *Attorney, Agent, or Firm* — Caldwell Intellectual Property Law

(57) ABSTRACT

In an aspect, a system for generating a virtual assistant in a messaging user interface, the system comprising a computing device designed and configured to initiate a virtual message user interface between a user client device and the computing device; receive a user message entered by a user into the virtual message user interface; select a conversation profile for the virtual assistant as a function of the user message, wherein the conversation profile comprises behavior that the user uses to communicate; prioritize an agenda action of a plurality of agenda actions contained within a user agenda list as a function of the user message; and generate a response to the user message comprising the prioritized agenda action, wherein the response is further generated as a function of the selected conversation profile.

20 Claims, 8 Drawing Sheets

(51) Int. Cl.
  *G06N 3/006*    (2023.01)
  *H04L 51/02*    (2022.01)
  *H04L 51/046*   (2022.01)

(56) References Cited

U.S. PATENT DOCUMENTS

| | | | |
|---|---|---|---|
| 10,318,096 | B2 | 6/2019 | Bhardwaj et al. |
| 10,496,705 | B1 | 12/2019 | Irani et al. |
| 10,524,092 | B2 | 12/2019 | Gandhi et al. |
| 2016/0180222 | A1 | 6/2016 | Sierhuis et al. |
| 2018/0121432 | A1 | 5/2018 | Parson et al. |
| 2019/0171845 | A1 | 6/2019 | Dotan-Cohen et al. |
| 2020/0211532 | A1* | 7/2020 | Rule ............... G10L 25/48 |
| 2020/0367807 | A1* | 11/2020 | Lassoued ......... A61B 5/7275 |
| 2022/0141616 | A1* | 5/2022 | Myshenin ........ G06Q 10/06311 |
| | | | 455/456.3 |

OTHER PUBLICATIONS

Sandra Hauser-Ulrich, Hansjörg Künzli, Danielle Meier-Peterhans, Tobias Kowatsch, A smartphone-based health care chatbot to promote self-management of chronic pain (SELMA): pilot randomized controlled trial, Dec. 31, 2020.

Ahmet Baki Kocaballi, Juan C. Quiroz, Dana Rezazadegan, Shlomo Berkovsky, Farah Magrabi, Enrico Coiera, Liliana Laranjo, Responses of conversational agents to health and lifestyle prompts: investigation of appropriateness and presentation structures, Dec. 31, 2020.

* cited by examiner

METHODS AND SYSTEMS FOR GENERATING A VIRTUAL ASSISTANT IN A MESSAGING USER INTERFACE

CROSS-REFERENCE TO RELATED APPLICATIONS

This application is a continuation of Non-provisional application Ser. No. 16/912,040, filed on Jun. 25, 2020, and entitled "METHODS AND SYSTEMS FOR GENERATING A VIRTUAL ASSISTANT IN A MESSAGING USER INTERFACE," the entirety of which is incorporated herein by reference.

FIELD OF THE INVENTION

The present invention generally relates to the field of computing. In particular, the present invention is directed to methods and systems for generating a virtual assistant in a messaging user interface.

BACKGROUND

Keeping track of, prioritizing, and completing one's agenda actions can be difficult. Frequently, agenda actions can be forgotten or lost within a multitude of agenda actions that need to be completed. Further, integrating agenda actions relating to all aspects of one's responsibilities can be challenging.

SUMMARY OF THE DISCLOSURE

In an aspect, a system for generating a virtual assistant in a messaging user interface, the system comprising a computing device designed and configured to initiate a virtual message user interface between a user client device and the computing device; receive a user message entered by a user into the virtual message user interface; select a conversation profile for the virtual assistant as a function of the user message, wherein the conversation profile comprises behavior that the user uses to communicate; prioritize an agenda action of a plurality of agenda actions contained within a user agenda list as a function of the user message; and generate a response to the user message comprising the prioritized agenda action, wherein the response is further generated as a function of the selected conversation profile.

In an aspect, a method for generating a virtual assistant in a messaging user interface, the method comprising a computing device designed and configured to initiate a virtual message user interface between a user client device and the computing device; receiving a user message entered by a user into the virtual message user interface; selecting a conversation profile for the virtual assistant as a function of the user message, wherein the conversation profile comprises behavior that the user uses to communicate; prioritizing an agenda action of a plurality of agenda actions contained within a user agenda list as a function of the user message; and generating a response to the user message comprising the prioritized agenda action, wherein the response is further generated as a function of the selected conversation profile.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a virtual assistant in a messaging user interface. In an embodiment, a virtual message user interface is initiated between a user client device and a computing device. A user message is entered by a user into the messaging user interface. The computing device analyzes the user message and generates a user-action learner to identify and generate a response to the user message.

Figure 1:
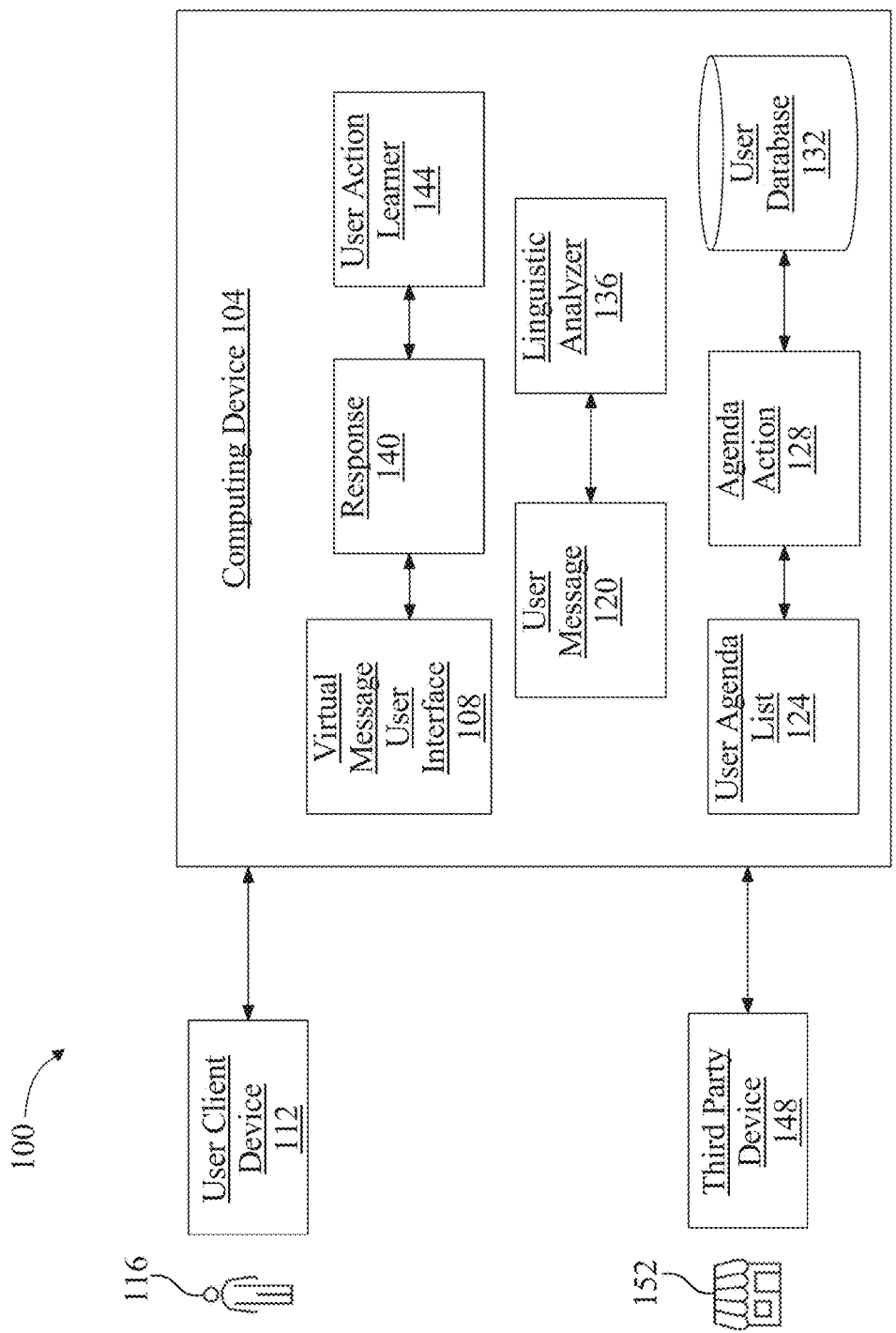
FIG. 1 is a block diagram illustrating an exemplary embodiment of a system for generating a virtual assistant in a messaging user interface.

Referring now to FIG. 1, an exemplary embodiment of a system 100 for generating a virtual assistant in a messaging user interface is illustrated. System 100 includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or connect with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or connect with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an association, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be transmitted to and/or from a computer and/or a computing device 104. Computing device 104 may include but is not limited to, for example, a computing device 104 or cluster of computing devices 104 in a first position and a second computing device 104 or cluster of computing devices 104 in a second position. Computing device 104 may include one or more computing devices 104 dedicated to data storage, security, dispersal of traffic for load balancing, and the like. Computing device 104 may distribute one or more computing tasks as described below across a plurality of computing devices 104 of computing device 104, which may operate in parallel, in series, redundantly, or in any other manner used for dispersal of tasks or memory between computing devices 104. Computing device 104 may be implemented using a "shared nothing" architecture in which data is cached at the operative, in an embodiment, this may enable scalability of system 100 and/or computing device 104.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence recurrently until a desired or commanded outcome is achieved; repetition of a step or a sequence of steps may be performed iteratively and/or recursively using outputs of previous repetitions as inputs to subsequent repetitions, assembling inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to initiate a virtual message user interface 108 between a user device and computing device 104. A "virtual message user interface," as used in this disclosure, is a messaging service for communication within a user interface. A messaging service may include an application, script, and/or program capable of generating messages using language, including any numeric, symbolic, and/or character based language. A user interface allows users to interface with electronic devices through graphical icons and audio indicators, including primary notation, text based user interfaces, typed command labels, and/or text navigation. Virtual message user interface 108 may include a form or other graphical element having display fields, where one or more elements of information may be displayed. Virtual message user interface 108 may include sliders or other user commands that may allow a user to select one or more characters. Virtual message user interface 108 may include free form textual entries, where a user may type in responses and/or messages. Virtual message user interface 108 may display data output fields including text, images, or the like containing one or more messages. Virtual message user interface 108 may include data input fields such as text entry windows, drop-down lists, buttons, checkboxes, radio buttons, sliders, links, or any other data input interface that may capture user interaction as may occur to persons skilled in the art upon reviewing the entirety of this disclosure. Virtual message user interface 108 may be provided, without limitation, using a web browser, a native application, a mobile application, or the like.

With continued reference to FIG. 1, computing device 104 initiates virtual message user interface 108 and user client device 112. A "user client device," as used in this disclosure, is any computing device, including a mobile device such as a smartphone and/or tablet, laptop, desktop, and/or any other type of computing device. User client device 112 is operated by a user 116. A "user," as used in this disclosure, is any human being. Computing device 104 initiates virtual message user interface 108 utilizing any network methodology as described herein.

With continued reference to FIG. 1, computing device 104 receives a user message 120 entered by a user into virtual message user interface 108. A "message," as used in this disclosure, is any communication, including any verbal, written, and/or recorded communication. A communication may include textual and/or non-textual communications, including one or more images, graphics, symbols, characters, and/or numerical representations of the communication. A user message 120 may contain a calendar entry. A "calendar entry," as used in this disclosure, is a user's schedule. A calendar entry may include one or more appointments that may be scheduled on a particular day and/or time of the user's schedule. A calendar entry may include a user's work-related schedule, including for example any scheduled meetings, work related holidays, working hours, and the like. For instance and without limitation, a calendar entry may include a conference call that a user has every Wednesday morning with a supplier of parts for the user's business. A calendar entry may include a user's personal schedule, including personal appointments such as meetings with friends, medical appointments, recreational sporting activities, concerts, and the like.

With continued reference to FIG. 1, a user message 120 may include an elemental entry. An "elemental entry," as used in this disclosure, is any communication relating to a user's body. An elemental entry may include information describing the health state of a user, including the user's physical, mental, and social well-being. An elemental entry may include entries describing any meals a user consumed over the course of the past week. For example, an elemental entry may contain a log of all meals that a user has consumed on a meals and nutritional platform over the course of the past six weeks. An elemental entry may include entries describing a user's fitness habits, including logs and/or descriptions of any work-outs that a user participated in. An elemental entry may include entries describing any sleeping patterns of a user, including the number of hours that a user sleeps on average in a night, how many times the user woke throughout the night, how long it took the user to fall asleep, what time the user woke up, and the like. An elemental entry may include entries describing any social interactions a user had, such as any friends that a user met for coffee, or a support group meeting that a user attended. Information relating to an elemental entry may be received from a sensor that may be attached to user client device 112 and/or in communication with user client device 112 and/or computing device 104. A "sensor," as used in this disclosure, is any device, module, machine, and/or subsystem configured to detect events or changes in its environment and transmit the information to other devices. A sensor may include an electromagnetic sensor, including without limitation electroencephalographic sensors, magnetoencephalographic sensors, electrocardiographic sensors, electromyographic sensors, or the like. A sensor may include a weight scale. A sensor may include a temperature sensor. A sensor may include any sensor that may be included in user client device 112 and/or wearable device, including without limitation a motion sensor such as an inertial measurement unit (IMU), one or more accelerometers, one or more gyroscopes, one or more magnetometers, or the like. A wearable and/or user client device sensor may capture step, gait, and/or other mobility data, as well as data describing activity levels, sleep levels and/or physical fitness. A wearable and/or user client device sensor may detect heart rate or the like. A sensor may detect any hematological parameter including blood oxygen level, pulse rate, heart rate, pulse rhythm, blood glucose and/or blood pressure.

With continued reference to FIG. 1, computing device 104 is configured to retrieve data relating to a user agenda list 124. An "agenda list," as used in this disclosure, is a compilation of one or more agenda actions 128 that need to be completed. An "agenda action," as used in this disclosure, is any task that needs to be completed, related to a user's personal and/or professional life. For instance and without limitation, an agenda list may contain an agenda action 128 such as to purchase a blow up air mattress. In yet another non-limiting example, an agenda list may contain a task such as ordering coffee for a work meeting in the morning. An agenda list may be stored within user database 132. User database 132 may be implemented without limitation, as a relational database, a key-value retrieval datastore such as a NOSQL database, or any other format or structure for use as a datastore that a person skilled in the art would recognize as suitable upon review of the entirety of this disclosure.

With continued reference to FIG. 1, computing device 104 is configured to retrieve a previous message entered by a user. Information relating to previous messages entered by a user 116, may be stored within user database. Computing device 104 may generate a query to locate a message that was received during a certain period of time, and/or a message that relates to a specific topic or subject. A "query," as used in this disclosure, is any request generated to retrieve and/or locate information from a database. A query may include choosing parameters to generate a query from a menu of options. In such an instance, a list of parameters may be assembled, from which one or more parameters may be chosen to generate a query. A query may include a query by example, where computing device 104 presents a blank records, and allows a user to specify the fields and values that define the query. A query may include query language, where a request to locate information may be a stylized query written in query language. Computing device 104 may prioritize a plurality of action agendas contained within the user agenda list as a function of retrieving a previous message. Prioritizing action agendas may include determining and/or arranging agenda actions that need to be completed in order of priority and/or importance. Information contained within a previous message may specify the order and/or importance of agenda actions. For instance and without limitation, computing device 104 may retrieve a previous message entered by a user that specifies that the user likes to batch cook home cooked meals every weekend and prefers to have groceries delivered in time before the weekend, either on Thursday or Friday. In such an instance, computing device 104 may prioritize an agenda action contained within a user agenda list to go grocery shopping and prioritize grocery shopping above weeding the user's garden on a Friday afternoon.

With continued reference to FIG. 1, computing device 104 is configured to analyze a user message 120, to identify an agenda action relating to the user message 120. Computing device 104 analyzes a user message 120, utilizing linguistic analyzer 136. A "linguistic analyzer," as used in this disclosure, is any language processing analysis module that enables computing device 104 to acquire meaning from messages. Linguistic analyzer 136 may be utilized to identify a structure, phrases, words, and/or other content or characteristics of a message entered by a user. Linguistic analyzer 136 may be utilized to determine the content and/or subject of a user message. Linguistic analyzer 136 may use an identified content to generate a response to a user message, including a response intended to direct a flow of conversation.

With continued reference to FIG. 1, linguistic analyzer 136 analyzes a user message utilizing statistical inferences to learn rules through the analysis of large corpora of documents. Linguistic analyzer 136 may generate one or more machine-learning algorithms that utilize features generated from input data. Machine-learning algorithms may include generating a decision tree. A decision tree includes generating a structure in which each internal node represents a "test" on an attribute, each branch represents the outcome of the test, and each leaf node represents a class label. A path from a root to a leaf may represent classification rules. Linguistic analyzer 136 may generate one or more statistical models, which may be utilized to make probabilistic decisions based on attaching real-valued weights to each input feature.

With continued reference to FIG. 1, linguistic analyzer 136 may analyze a user message 120 utilizing syntax analysis, such as through morphological segmentation. For example, linguistic analyzer 136 may separate words into individual morphemes and identify the class of the morphemes. Linguistic analyzer 136 may analyze a user message 120 by parsing a user message. Parsing may include determining a parsing tree and/or grammatical analysis of a given sentence. Parsing may include dependency parsing where relationships between words in a sentence are analyzed. Parsing may include constituency parsing that focuses on building out a parsing tree using a probabilistic context free grammar, including for example stochastic grammar. Linguistic analyzer 36 may analyze a user message utilizing other forms of syntax analysis, including sentencing breaking, to find sentence boundaries; word segmentation to separate a chunk of continuous text into separate words; lemmatization, and/or grammar induction.

With continued reference to FIG. 1, linguistic analyzer 136 may analyze a user message 120 utilizing semantic analysis such as by analyzing lexical semantics to determine the computational meaning of individual words in context. Semantic analysis may include distributional semantics, to analyze how semantic representations are separate from data. Semantic analysis may include named entity recognition, to determine which items in a string of text map to names of people, places, organization, and the like. Semantic analysis may include natural language understanding, including converting chunks of text into more formal representations such as first-order logic structures. Natural language understanding may include the identification of intended semantics from multiple possible semantics that can be derived from a natural language expression. Semantic analysis may include optical character analysis, including determining corresponding text to an image representing printed text. Semantic analysis may include other forms of analysis including optical character recognition, question answering, recognizing textual entailment, relationship extraction, sentiment analysis, topic segmentation and recognition, and/or word sense disambiguation.

With continued reference to FIG. 1, linguistic analyzer 136 may perform discourse analysis to analyze a user message. Discourse analysis includes automatic summarization may include producing a readable summary of a chunk of text. Discourse analysis may include coreference resolution, which may determine from a given sentence or chunk of text, which words refer to the same objects. Linguistic analyzer 136 may analyze a user message by performing other various forms of analysis, including for example, speech recognition, speech segmentation, text-to-speech analysis, dialogue analysis, and/or cognition analysis.

With continued reference to FIG. 1, computing device 104 identifies using linguistic analyzer 136, a description of an agenda action contained within a user message. For example, a user message may contain an entry such as "cancel all meetings on Thursday June 26$^{th}$." Linguistic analyzer 136 identifies a description of an agenda action that includes "meetings on June 26$^{th}$." Computing device 104 generates a query containing a description of an agenda action. A query includes any of the queries as described above. Computing device 104 utilizes a query to locate an agenda action 128 contained within user agenda list 124, which may be stored within user database 132.

With continued reference to FIG. 1, computing device 104 is configured to analyze a user message 120 and identify a need for a user to provide more information. This may occur, for example, when computing device 104 is unable to identify a description of an agenda action 128 contained within a user message 120, and/or when there may be various agenda actions 128 related to a user message 120. Computing device 104 may identify a need for a user to provide more information, when information contained within a user message 120 may be lacking and require more information. For instance and without limitation, a user message 120 that contains an entry such as "order coffee," may prompt computing device 104 to identify a need for a user to provide more information, including what size coffee the user wishes to order, when the user wants the coffee order, what flavor and/or style of coffee the user is looking for, and where the user wants to order coffee from. Computing device 104 selects a conversation profile as a function of analyzing a user message 120. A "conversation profile," as used in this disclosure, is a compilation of one or more messages organized by style of communication. A style of communication may include one or more behaviors, or ways in which a user communicates. For example, a style of communication may include a direct style of communication, which includes explicit messages that clearly express a user's intentions. In yet another non-limiting example, a style of communication may include an affectionate communication style that includes emotional and sensitive messages that may contain implicit meanings contained within messages. In yet another non-limiting example, a style of communication may include an indirect style of communication, which may contain messages that mask a user's intentions and needs. Computing device 104 analyzes a user message 120 to determine a user's style of communication and select a conversation profile. For instance and without limitation, a user message 120 that contains elaborate figurative language, with lots of metaphors and provers may be determined to be an elaborate style of communication, while a user message 120 that contains lots of emojis, photographs, and heart shaped emojis may be determined to be an affectionate style of communication.

With continued reference to FIG. 1, a style of conversation profile contains a plurality of conversations. A "conversation," as used in this disclosure, is a communication session comprised of a series of one or more messages exchanged between two or more parties. A plurality of conversations contained within a conversation profile, may be organized by subject and/or topic. For example, a conversation profile such as a formal conversation profile, may contain a plurality of conversations organized by topic, including for example, friends, family, cooking, food delivery, shopping, appointments, schoolwork, and the like. Computing device 104 initiates a conversation within virtual message user interface as a function of selecting a conversation profile. In an embodiment, a conversation profile may seek to obtain more information from an analyzed message. For instance and without limitation, a user message 120 may contain a remark containing a user's sleep patterns including descriptions of how long the user slept each night for the past seven nights. In such an instance, computing device 104 may analyze the user message 120 containing the user's sleep patterns and determine that more information is needed to analyze the user's sleep patterns over the past month, and not just over the prior week. Computing device 104 selects a conversation profile and initiates a conversation within virtual message user interface 108 to obtain more sleep pattern data.

With continued reference to FIG. 1, computing device 104 is configured to generate a response 140 to a user message 120 as a function of analyzing a user message 120. A "response," as used in this disclosure, is a reply to a user message. A response 140 may contain a remark and/or replay to a user message 120. For instance and without limitation, a user message 120 that contains a remark 144 to schedule a user a haircut may cause computing device 104 to generate a response 140 that contains a question to ask the user if the user needs to get the user's hair colored or if the user is only looking for a haircut. In yet another non-limiting example, a response 140 may contain a non-textual response, such as a photograph of a scheduled and confirmed appointment for the user's haircut. In yet another non-limiting example, a response 140 may contain a graphical and/or multimedia response, including for example, a response 140 containing an emoji, a photograph, a screenshot, a video, an infographic, music, an illustration, a piece of art, a graphics interchange format, and the like.

With continued reference to FIG. 1, computing device 104 is configured to generate a response 140 to a user message 120 by generating a user-action learner 144. User-action learner 144 may generate one or more modules that learn input-output pairs pertaining to previous messages and responses pertaining to previous communications with a particular user. User-action learner 144 may include any elements suitable for use in a machine-learning process. User-action learner 144 may generate a user-action model, relating a user message 108 and a previous user message to a response. User-action learner 144 may be trained by computing device 104, utilizing user training data. "Training data," as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and continuing to refer to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data to be made applicable for two or more distinct machine-learning algorithms as described in further detail below. Training data used by computing device 104 and/or another device may correlate any input data as described in this disclosure to any output data as described in this disclosure. "User training data," as used in this disclosure, includes a plurality of data entries containing previous messages correlated to previous responses. Information pertaining to user training data may be stored within user database 132.

With continued reference to FIG. 1, user-action learner may be implemented as any machine-learning process. A "machine learning process," as used in this disclosure, is a process that automatically uses a body of data known as "training data" and/or a "training set" to generate an algorithm that will be performed by computing device 104 and/or any module to produce outputs given data provided as inputs; this is in contrast to a non-machine learning software program where the commands to be executed are determined in advance by a user and written in a programming language. A machine-learning process may be implemented, without limitation, as described in U.S. Nonprovisional application Ser. No. 16/502,835, filed on Jul. 3, 2019, and entitled "METHODS AND SYSTEMS FOR ACHIEVING VIBRANT CONSTITUTION BASED ON USER INPUTS," the entirety of which is incorporated herein by reference.

With continued reference to FIG. 1, user-action learner may be generated using a generative machine-learning process. A generative machine learning process is a process of determining the conditional probability of the observable X, given a target y, where, $P(X|Y=y)$. A generative machine learning process may be used to generate random instances or outcomes either of an observation and target (x,y), or of an observation x given a target value y. A generative machine-learning process may include generating one or more generative machine-learning models. A generative machine-learning model may include generating a deep generative model that may combine a generative machine-learning model with a deep neural network. A generative machine-learning model may include one or more machine-learning models including but not limited to a gaussian mixture model, a hidden Markov model, a mixture model, a probabilistic context-free grammar model, a Bayesian network, a Naïve Bayes model, an autoregressive model, an averaged one-dependence estimator model, a latent Dirichlet allocation model, a Boltzmann machine, a restricted Boltzmann machine, a deep belief network, a variational autoencoder, a generative adversarial network, a flow-based generative model, an energy based model and the like.

With continued reference to FIG. 1, computing device 104 identifies a response 140 as a function of user-action learner 144 and displays the response 140 within virtual message user interface 108. Computing device 104 displays response 140 utilizing any methodology as described herein.

With continued reference to FIG. 1, computing device 104 generates a response 140 by generating determining the context of a user message 120. Computing device 104 generates a context classifier. A "classifier," as used in this disclosure, is a process whereby computing device 104 derives from training data, a model known as a "classifier," for sorting inputs into categories or bins of data. A "context classifier," as used in this disclosure, is a classifier that uses a user message as an input and outputs a message context label. A "message context label," as used in this disclosure, is the identification of any purpose and/or circumstance that from the reason for a user entering a user message 120 within virtual message user interface 108. For example, a message context label may identify the setting for a user message 120, such as an upcoming event that a user needs to purchase an outfit for. In yet another non-limiting example, a message context label may identify an idea that a user has, such as to book a travel vacation. Context classifier may be generated using one or more classification algorithms. A classification algorithm may include a binary classifier, that results in only two distinct classes or with two possible outcomes. A classification algorithm may include a multi-class classifier, that results in more than two distinct classes. A classification algorithm may include for example, a naïve-Bayes classifier, a support vector machine, a k-nearest neighbor algorithm, a decision tree, a random forest, logistic regression, stochastic gradient descent, and the like. Computing device 104 identifies as a function of generating context classifier, a message context label for a user message. Computing device 104 selects a response as a function of a message context label. Computing device 104 selects a response by locating a response that relates to a message context label. For instance and without limitation, a message context label that indicates a user message 120 as relating to a birthday party may be used by computing device 104 to select a response that relates to a birthday and/or coordination of an event. In yet another non-limiting example, a message context label that indicates a user message 120 as relating to a work meeting may be used by computing device 104 to select a response that relates to an office setting. In an embodiment, responses by organized and/or categorized by context, as described below in more detail.

With continued reference to FIG. 1, computing device 104 is configured to identify a third-party device 148 as a function of generating a response 140 to a user message 120. A "third party device," as used in this disclosure, includes any device suitable for use as user client device 112 as described above in more detail. Third party device 148 is operated by a third party 152, where a third party 152 includes any human being other than user 116. A third party 152 may include an entity such as a corporation including a merchant, a retailer, a manufacturer, a business, and the like. For instance and without limitation, third party device 148 may include a computer operated by a local coffee shop or a mobile device operated by a user's hairdresser. Computing device 10 identifies a third party 152 utilizing linguistic analyzer 136 to locate and/or identify a third party 152 mentioned within a user message 120. Information relating to third party device identifiers and/or third parties may be contained within user database 132. For instance and without limitation, a user message 120 may specify "schedule a meeting with Brian at his earliest convenience." In such an instance, computing device 104 utilizes linguistic analyzer 136 to identify Brian as a third-party 152 identified within the user message 120. Computing device 104 then initiates virtual message user interface 108 between computing device 104 and third-party device 148 operated by Brian. In such an instance, computing device 104 may generate and transmit using virtual message user interface 108 a message to Brian asking him when he is available to schedule a meeting with user. Computing device 104 initiates virtual message user interface 108 utilizing any network methodology as described herein.

With continued reference to FIG. 1, computing device 104 is configured to complete an agenda action related to a user message 120. Completing an agenda action includes performing any step, method, and/or task to complete an agenda action. For example, an agenda action that contains a task such as rescheduling my haircut may be completed by computing device 104 when computing device 104 has rescheduled a user's haircut and confirmed a new appointment time. Computing device 104 updates a user agenda list 124 as a function of completing an agenda action 128, to reflect the agenda action as being complete. Computing device 104 displays a response 140 as a function of completing an agenda action. A response 140 may be displayed within virtual message user interface 108 to inform a user that an agenda action 128 has been completed. This may be performed utilizing any methodology as described herein.

Figure 2:
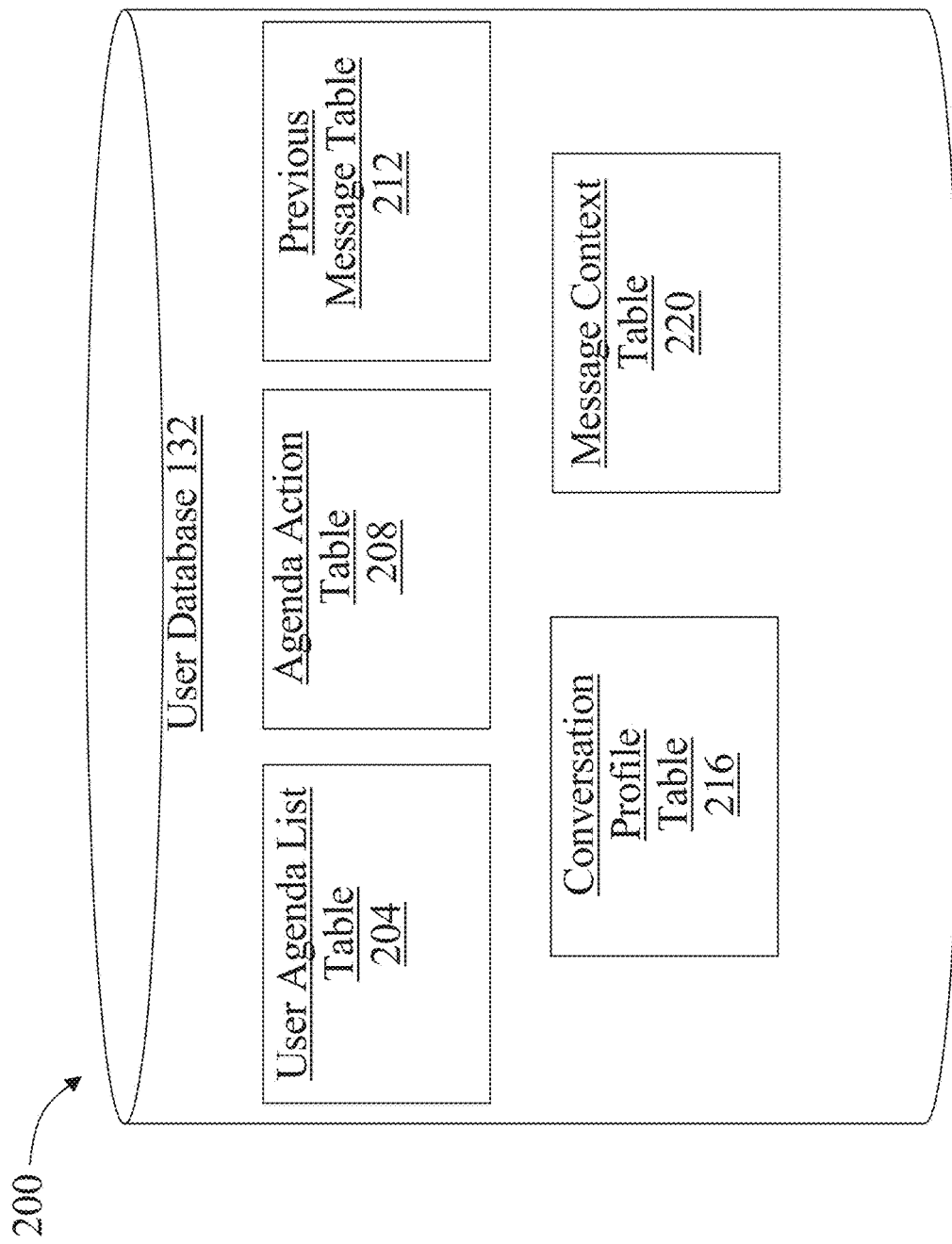
FIG. 2 is a block diagram illustrating an exemplary embodiment of a user database.

Referring now to FIG. 2, an exemplary embodiment 200 of a user database 132 is illustrated. User database may be implemented as any data structure as described above in more detail in reference to FIG. 1. One or more tables contained within user database 132 may include user agenda list table 204; user agenda list table 204 may contain information relating to a user's agenda list 124. For instance and without limitation, user agenda list table 204 may contain a user's agenda list 124 containing a list of all tasks that a user needs to perform within the next six weeks. One or more tables contained within user database 132 may include agenda action table 208; agenda action table 208 may include one or more agenda actions 128. For instance and without limitation, agenda action table 208 may include an agenda action that includes a task to visit the dentist next Thursday. One or more tables contained within user database 132 may include previous message table 212; previous message table 212 includes any previous messages entered by a user within virtual message user interface. For instance and without limitation, previous message table 212 may contain a log of all previous messages entered by a user into virtual message user interface. One or more tables contained within user database 132 may include conversation profile table 216; conversation profile table 216 may include information relating to one or more conversation profiles. For instance and without limitation, conversation profile table 216 may contain a direct conversation profile that includes various conversations organized by subject matter, as described above in more detail in reference to FIG. 1. One or more tables contained within user database 132 may include message context table 220; message context table 220 may include information describing one or more message contexts. For instance and without limitation, message context table 220 may include a message context label that labels a user message 120 as relating to an orthopedic medical appointment.

Figure 3:
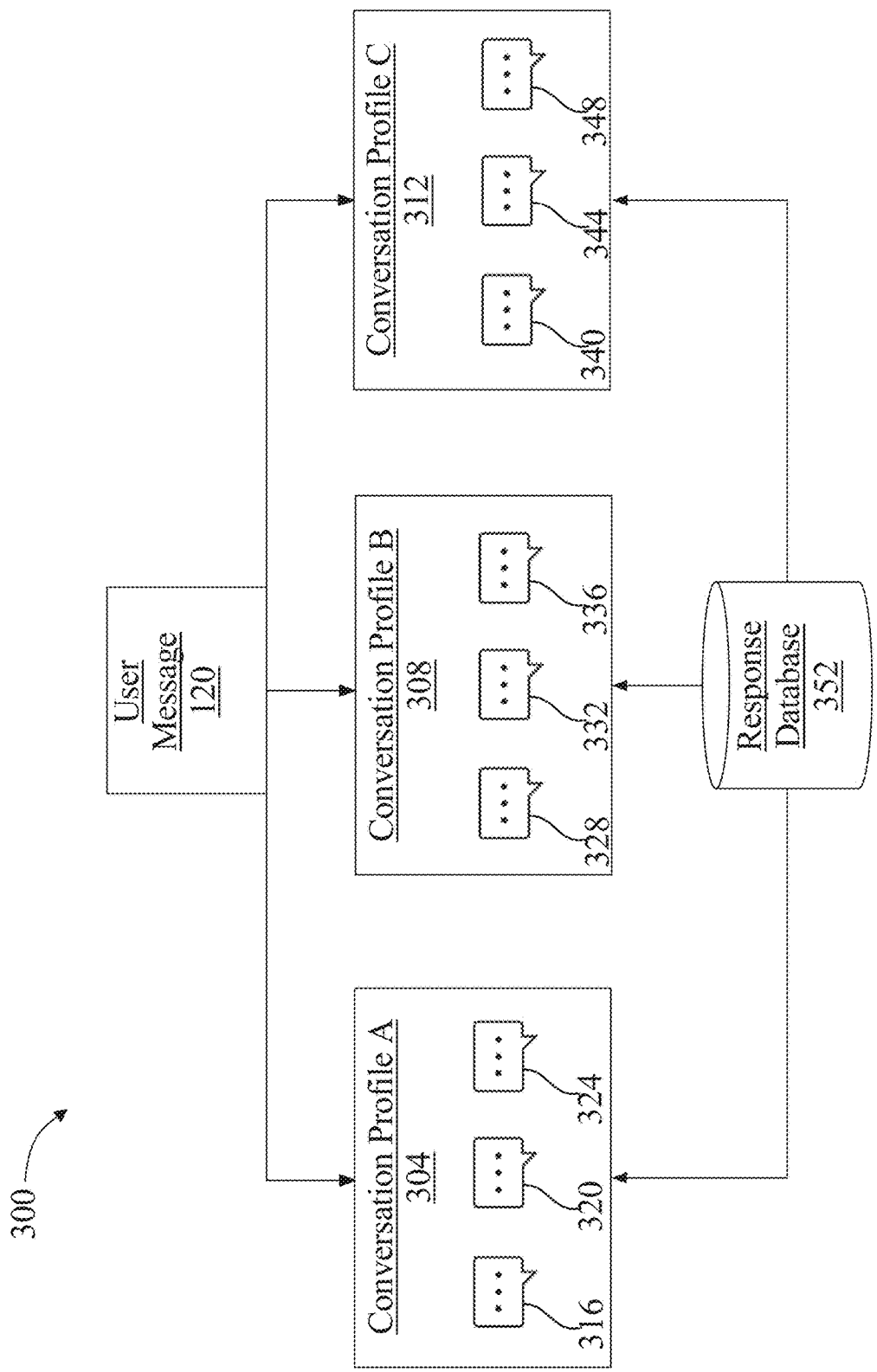
FIG. 3 is a diagrammatic representation of an exemplary embodiment of a conversation profile.

Referring now to FIG. 3, an exemplary embodiment 300 of a conversation profile is illustrated. Computing device 104 receives a user response 120, entered by a user into virtual response user interface 108. Computing device 104 analyzes a user response 120, utilizing linguistic analyzer 136, as described above in more detail in reference to FIG. 1. Linguistic analyzer 136 identifies words, persons, and/or places for example, contained within user response 120. Computing device 104 utilizes contents analyzed by linguistic analyzer 136, to select a conversation profile. A conversation profile includes any of the conversation profiles as described above in more detail in reference to FIG. 1. In an embodiment, computing device 104 may evaluate Conversation Profile A 304, Conversation Profile B 308, and/or Conversation profile C 312. A conversation profile contains a compilation of one or more responses organized by style of communication. For instance and without limitation, Conversation Profile A 304 may relate to a direct style of communication. In such an instance, Conversation Profile A 304 may contain a first response 316, a second response 320, and a third response 324. First response 316 may contain a direct style response relating to the weather, second response 320 may contain a direct style response relating to ordering food to be delivered, and third response 324 may contain a direct style response relating to a television purchase. Conversation Profile B 308 may relate to a graphic style of communication where Conversation Profile B 308 may contain a first response 328, a second response 332, and a third response 336. Conversation Profile C 312 may contain a first response 340, a second response 344, and a third response 348. One or more responses 140, contained within a conversation profile may be stored within response database 352. Response database 352 may be implemented as any data structure suitable for use as user database 132, as described above in more detail in reference to FIG. 1. One or more responses may be utilized to generate a response stored within a conversation profile. Responses contained within response database may be organized by communication style.

Figure 4:
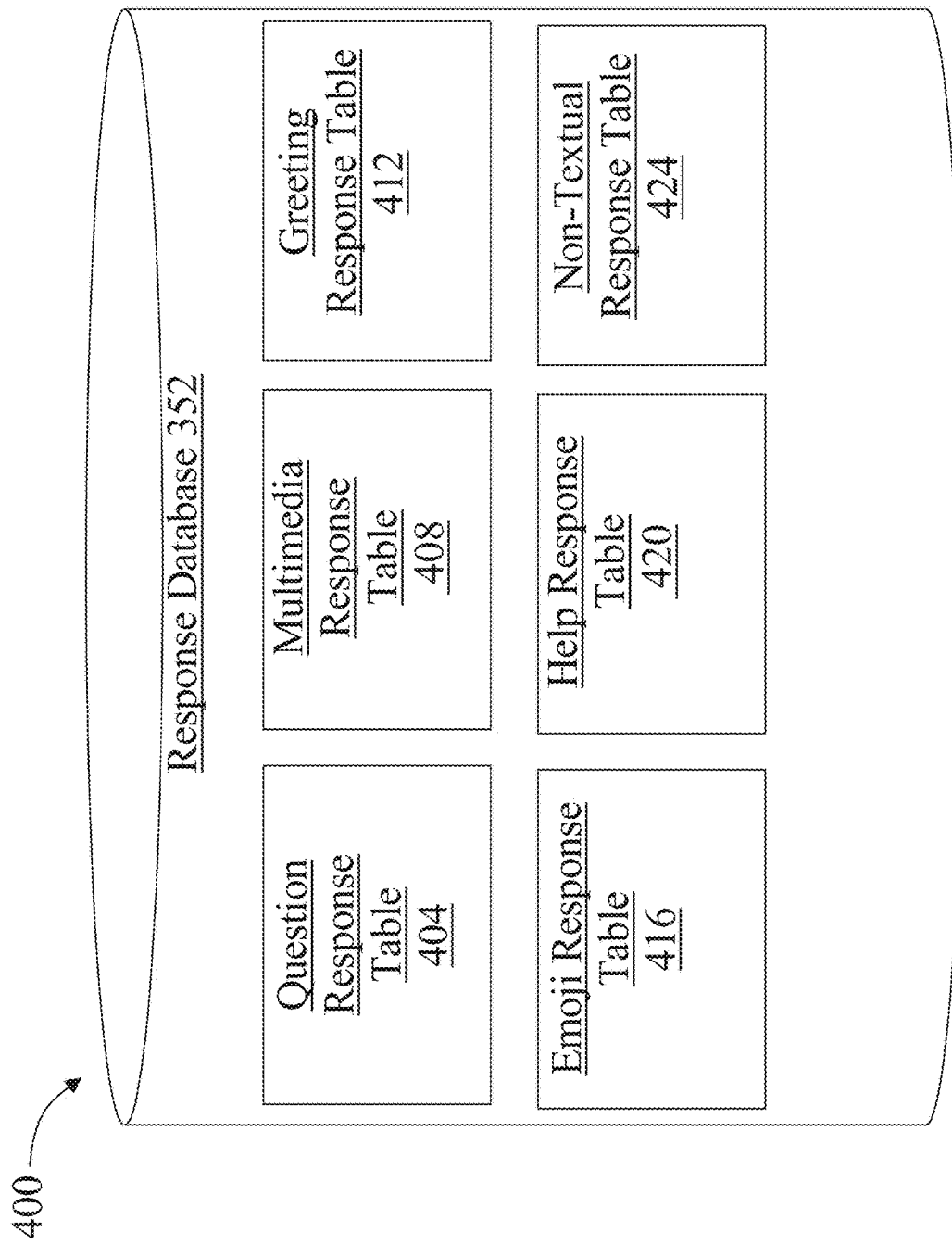
FIG. 4 is a block diagram illustrating an exemplary embodiment of a response database.

Referring now to FIG. 4, an exemplary embodiment 400 of response database 352 is illustrated. Response database 352 may be implemented as any data structure suitable for use as user database 132, as described above in more detail in reference to FIG. 1. One or more tables contained within response database 352 may include question response table 404; question response table 404 may include one or more responses 144 that contain a question. One or more tables contained within response database 352 may include multimedia response table 408; multimedia response table 408 may include one or more responses 144 that contain multimedia including for example, text, audio, images, animations, video, and/or interactive content. One or more tables contained within response database 352 may include greeting response table 412; greeting response table 412 may include one or more responses 144 that contain a greeting. One or more tables contained within response database 352 may include emoji response table 416; emoji response table 416 may include one or more responses 144 that contain an emoji. One or more tables contained within response database 352 may include help response table 420; help response table 420 may include one or more responses 144 that contain a response to help a user utilize system 100. One or more tables contained within response database 352 may include non-textual response table 424; non-textual response table 424 may include one or more responses 144 that contain a non-textual response.

Figure 5:
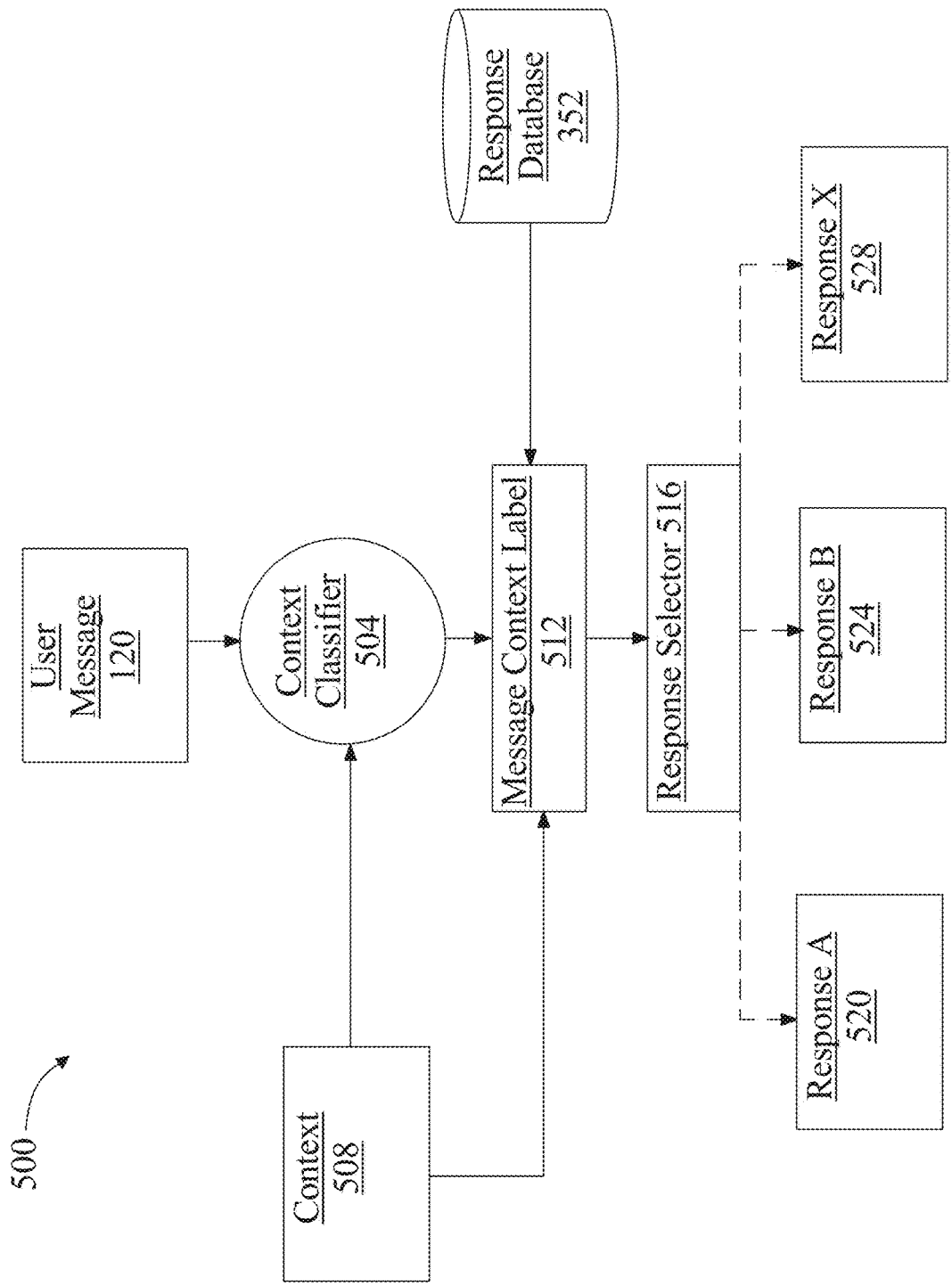
FIG. 5 is a diagrammatic representation of an exemplary embodiment of a context classifier.

Referring now to FIG. 5, an exemplary embodiment 500 of context classifier is illustrated. Computing device 104 receives a user message 120, entered by a user. A user message 120 includes any of the user messages as described above in more detail in reference to FIG. 1. Computing device 104 generates a context classifier 504, which evaluates the context 508 of a user message 120. A context 508 of a user message 120 includes the identification of any purpose and/or circumstance that from the reason for a user entering a user message 120 within virtual message user interface 108. For instance and without limitation, a context 508 of a user message 120 may indicate that a user message 120 was generated because a user uploaded information pertaining to a user's exercise routine from the previous three months. Context classifier 504 utilizes a user message 120 as an input, and outputs a message context label 512. A message context label 512 includes any message context label as described above in more detail in reference to FIG. 1. Computing device 104 utilizes a message context label 512 in combination with response selector 516 to select a response as a function of a message context label 512. Response selector 516 may aid computing device 104 in using a message context label 512 to select a response. Response selector 516 may evaluate a plurality of responses such as response A 520, response B 524, and response X 528, to determine which response relates to message contest label 512, and/or which response has a similar context 508, and most appropriately responds to user message 120. For instance and without limitation, message context label 512 may relate to an upcoming birthday party, because the user needs to purchase a present for the birthday girl. In such an instance, response selector 516, may evaluate response A 520 which contains a smiley face emoji, response B 524 which contains a list of stores that sell birthday presents, and response x 528 which contains a response containing instructions for how to restart virtual message user interface when it is frozen. In such an instance, response selector 516 may evaluate the responses and select response B 524, because it most closely relates to the context 508 of user's message 120. Computing device 104 stores one or more responses within response database 352.

Figure 6:
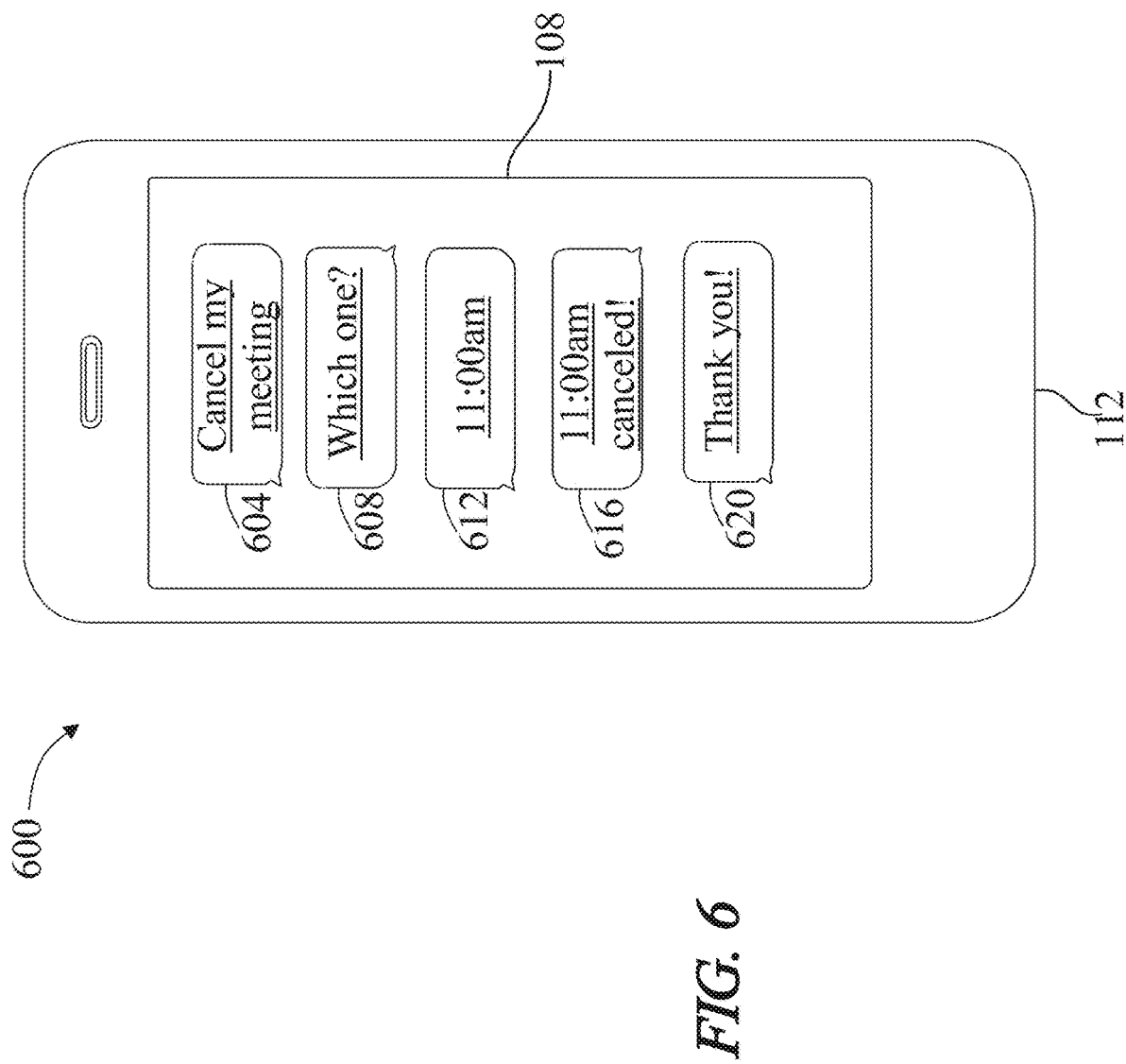
FIG. 6 is a diagrammatic representation of an exemplary embodiment of a conversation.

Referring now to FIG. 6, an exemplary embodiment 600 of a conversation displayed on user client device 112 is illustrated. In an embodiment, virtual message user interface 108 receives a first user message 604, containing a request for computing device 104 to "Cancel my meeting." Computing device 104 utilizes linguistic analyzer 136 to analyze a user message 108 and identifies a need for a user to provide more information. For example, using first user message 604, computing device 104 may be unable to identify an agenda action related to first user message 604, because there is no information specifying which meeting needs to be canceled, and when the meeting is scheduled. Computing device 104 selects a conversation profile and initiates a conversation within virtual message user interface 108. In such an instance, computing device 104 follows up by asking a user more information, contained within response 608, by specifying "Which one?" A conversation then ensues, where a user replies with message 612 "11:00 am," and computing device then completes the request for cancel a user's 11:00 am meeting by generating a response that states in response 616 "11:00 am canceled!" A user then replies by stating in message 620 "Thank you!" In such an instance, after canceling user's 11:00 am meeting and rescheduling the meeting, computing device 104 may update user agenda list, to contain the newly generated meeting time as well as to reflect the proper cancelation of the user's previously scheduled 11:00 am meeting.

Figure 7:
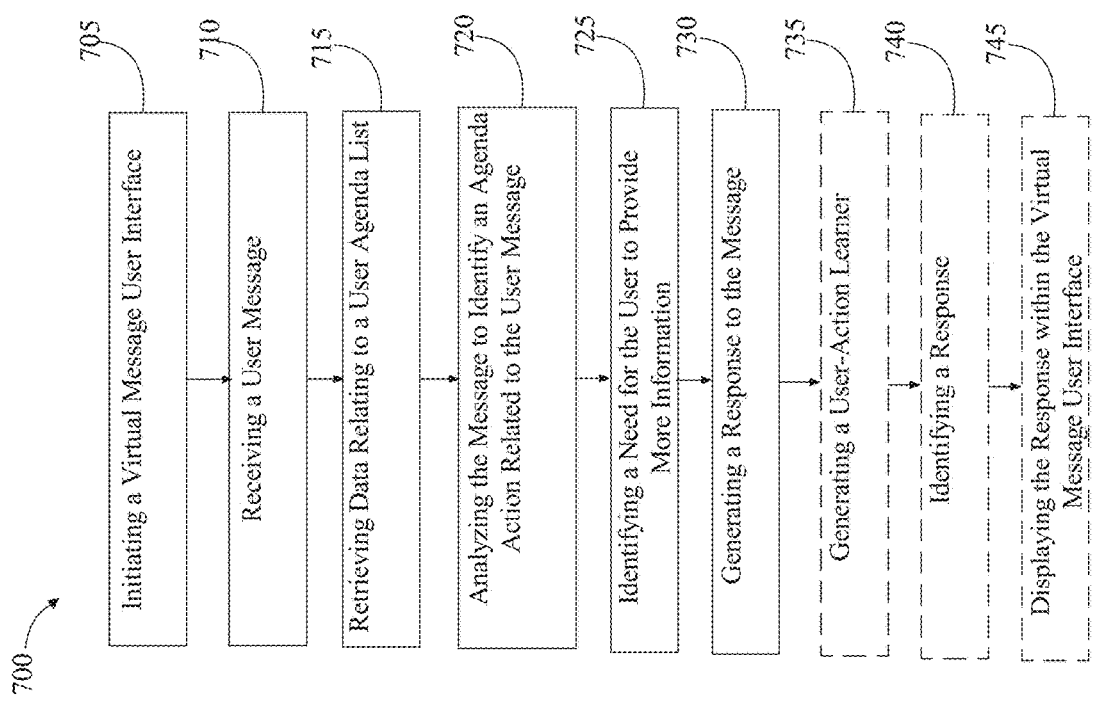
FIG. 7 is a block diagram illustrating an exemplary embodiment of a method of generating a virtual assistant in a messaging user interface.

Referring now to FIG. 7, an exemplary embodiment 700 of a method of generating a virtual assistant in a messaging user interface is illustrated. At step 705, computing device 104 initiates a virtual message user interface 108 between a user client device 112 and computing device 104. Initiating virtual message user interface 108 may be performed utilizing any methodology as described above in more detail in reference to FIG. 1. Virtual message user interface 108 may be implemented between user client device 112 and computing device 104 utilizing any of the network methodologies as described above. In an embodiment, virtual message user interface 108 may allow for communications to be transmitted and received between user client device 112 and computing device 104. Virtual message user interface 108 may contain a graphical user interface to allow for the transmission and/or display of both textual and/or non-textual outputs. A user client device 112 includes any of the user client devices 112 as described above in more detail in reference to FIG. 1. User client device 112 is operated by a user 116.

With continued reference to FIG. 7, at step 710, computing device 104 receives a user message 120 entered by a user 116, into virtual message user interface 108. A user message 120 includes any of the user messages 120 as described above in more detail in reference to FIG. 1. A user message 120 contains any communication, including any verbal, written, and/or recorded communication. A user message 120 includes a calendar entry, including any of the calendar entries as described above in more detail in reference to FIG. 1. For instance and without limitation, a user message 120 may include a calendar entry containing a user's calendar containing all upcoming appointments that a user has scheduled over the course of the next twelve months. A user message 120 includes an elemental entry, including any of the elemental entries as described above in more detail in reference to FIG. 1. For instance and without limitation, a user message 120 may contain a sensor reading containing a user's average heart rate while engaging in an exercise routine over the course of the past seven days. In yet another non-limiting example, a user message 120 may contain a complaint that a user has pain and discomfort in the user's lower back. Information pertaining to a user message 120 may be stored within user database 132, as described above in more detail in reference to FIG. 1.

With continued reference to FIG. 7, at step 715, computing device 104 retrieves data relating to a user agenda list, including a plurality of agenda actions. A user agenda list 124 includes any of the user agenda lists as described above in more detail in reference to FIG. 1. A user agenda list 124 includes a plurality of agenda actions 128. An agenda action 128 includes any of the agenda actions as described above in more detail in reference to FIG. 1. An agenda action 128 includes a task that a user needs to complete. For instance and without limitation, an agenda action 128 may include a task such as pick up dry cleaning or mow the lawn. An agenda action 128 may include any work and/or personal related tasks, including for example, a work related task to purchase a new anti-virus software or a work related task to prepare a presentation to attract new clients. An agenda action 128 may include a personal task, such as purchasing more coffee at the grocery store, or scheduling a dental appointment within the next few weeks. Information pertaining to one or more agenda actions may be stored within user database 132. Computing device 104 prioritizes a plurality of agenda actions 128 contained within a user agenda list 124 to update user agenda list 124 by priority of which agenda actions 128 are most important and which agenda actions need to be completed first. Computing device 104 retrieves a previous message generated by a user. Previous messages may be stored within user database 132 as described above in more detail in reference to FIG. 1. Computing device 104 prioritizes a plurality of agenda actions 128 contained within user agenda list 124 as a function of a retrieved message. For instance and without limitation, a previous message may indicate that a user routinely obtains a haircut every six or seven weeks, depending on the user's availability, while the user also routinely has a personal training appointment every Wednesday, and the user has never missed an appointment. In such an instance, computing device 104 utilizes the information contained within a previous user message, to prioritize agenda actions 128 contained within a user agenda list 124. In such an instance, computing device 104 prioritizes an agenda action 128 of the user's personal training appointment as having a higher priority and being of more importance than a user's haircut, which the user is much more flexible about.

With continued reference to FIG. 7, at step 720, computing device 104 analyzes a user message 120 to identify an agenda action related to a user message 120. Computing device 104 analyzes a user message 120, utilizing linguistic analyzer 136, as described above in more detail in reference to FIG. 1. Linguistic analyzer 136 may be implemented as any data structure as described above in more detail in reference to FIG. 1. Computing device 104 identifies using linguistic analyzer 136, a description of an agenda action contained within user message 120. For instance and without limitation, linguistic analyzer 136 may utilize one or more language processing techniques to identify one or more words, phrases, persons, and/or places contained within a user message. Language processing techniques employed by linguistic analyzer 136 include any of the language processing techniques as described above in more detail in reference to FIG. 1. Computing device 104 generates a query containing a description of an agenda action 128 to locate the agenda action 128 contained within a user agenda list 124. A query includes any of the queries as described above in more detail in reference to FIG. 1.

With continued reference to FIG. 7, at step 725, computing device 104 identifies a need for a user to provide more information. Computing device 104 identifies a need for a user to provide more information utilizing linguistic analyzer 136 to analyze a user message 120, and determine a need for a user 116, to provide more information. This may occur, for example, when a user message 120 is missing details, is not complete, when an agenda action cannot be located that relates to a user message 120, and the like. Computing device 104 selects a conversation profile as a function of analyzing a user message 120 and initiates a conversation within virtual message user interface 108. This may be performed utilizing any of the methodologies as described above in more detail in reference to FIGS. 1-6. A conversation profile includes any of the conversation profiles as described above in more detail. A conversation profile may contain one or more responses 140, that may be utilized to initiate a conversation within virtual message user interface 108.

With continued reference to FIG. 7, at step 730, computing device 104 generates a response 140 to a user message as a function of analyzing a user message. A response 140 includes any of the responses as described above in more detail in reference to FIG. 1. A response may include a textual and/or non-textual output. At step 735, computing device 104 generates a response by generating a user-action learner. User-action learner includes any of the user-action learners as described above in more detail in reference to FIG. 1. User-action learner uses a previous message and a user message as an input, and outputs a response. User-action learner may be implemented as any machine-learning process as described above in more detail in reference to FIG. 1. User-action learner may be generated as a generative machine-learning process as described above in more detail in reference to FIG. 1. At step 740, computing device 104 identifies a response as a function of generating the user-action learner. At step 745, computing device 104 displays the response within virtual message user interface 108.

With continued reference to FIG. 7, computing device 104 selects a response by generating context classifier. Context classifier may be generated utilizing any of the methodologies as described above in more detail in reference to FIG. 1. Context classifier uses a user message 120 as an input, and outputs a message context label. A message context label includes any of the message context labels as described above in more detail in reference to FIG. 1. Computing device 104 identifies as a function of generating context classifier, a message context label for a user message 120, and selects a response as a function of the message context label. This may be performed utilizing any of the methods as described above in more detail in reference to FIG. 1. For instance and without limitation, a message context labels that indicates a user message 120 is about golf equipment may be utilized to select a response that relates to golf equipment. In an embodiment, responses stored within response database 352 may be organized and stored based on context of which each response relates to. Computing device 104 evaluates responses organized by context within response database 352, to select a response that matches and/or relates to a message context label.

With continued reference to FIG. 7, computing device 104 identifies a third-party device 148 as a function of generating a response 140 to a user message 140. In an embodiment, a third-party device may be identified by linguistic analyzer 136 when analyzing a user message 120. For example, a user message 120 may include a message to schedule a massage for a user on a specified day with the user's masseuse, Arnold. In such an instance, linguistic analyzer 136 analyzes user message 120 and identifies Arnold as a third party 148 and initiates virtual message user interface 108 with third-party device 148, operated by the spa where Arnold works, to send a message to the third-party device within virtual message user interface 108 and schedule the massage. Initiating virtual message user interface 108 between computing device 104 and third-party device 148 allows computing device 104 to send messages to third-party device 148 and complete agenda actions contained within user message. Computing device 104 completes an agenda action 128 related to a user message 120 and updates a user agenda list 124 as a function of completing the agenda action 128. Computing device 104 displays a response 140 as a function of completing an agenda action 128. A response 140 may be displayed within virtual message user interface 108 and inform a user about the completion of an agenda action 128.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
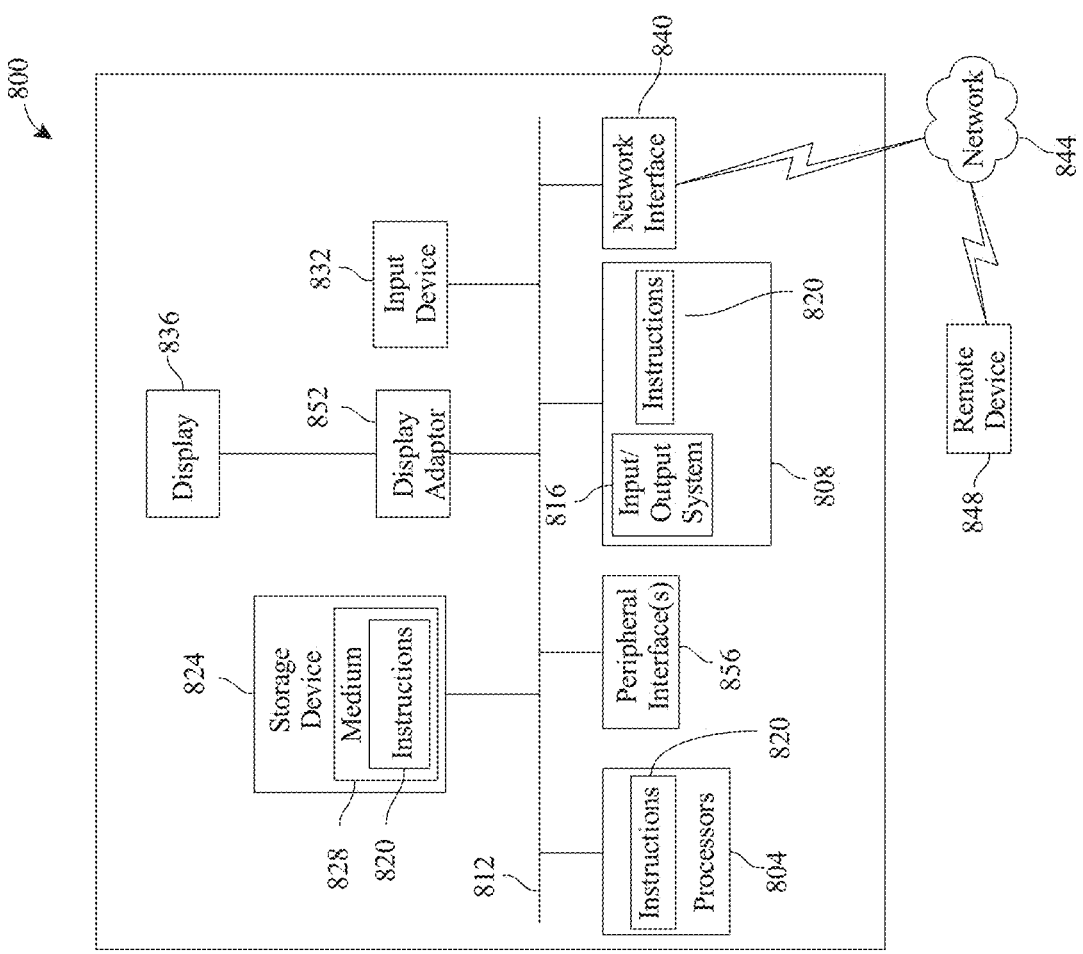
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for generating a virtual assistant in a messaging user interface, the system comprising a computing device designed and configured to:
   receive, from a sensor, a change in a biological state of a user;
   retrieve at least one previous message entered by the user, wherein the at least one previous message comprises an indication of importance for at least one agenda action;
   prioritize an agenda action of a plurality of agenda actions contained within a user agenda list as a function of the change in the biological state of the user and the indication of importance for the at least one agenda action;
   initiate a virtual message user interface between a user client device and the computing device;
   select a conversation profile for the virtual assistant, wherein the conversation profile comprises a behavior that the user uses to communicate;
   generate a communication to the user comprising the prioritized agenda action, wherein the communication is further generated as a function of the selected conversation profile;
   identify a third-party device as a function of the communication; and
   automatedly share information with the third-party device as a function of the communication.

2. The system of claim 1, wherein the conversation profile comprises an affectionate communication style.

3. The system of claim 1, wherein the conversation profile comprises a direct communication style.

4. The system of claim 1, wherein the conversation profile relates to a graphic style of communication.

5. The system of claim 1, wherein the computing device identifies a third-party by utilizing a linguistic analyzer.

6. The system of claim 1, wherein the third-party device comprises a computer operated by a health-related service.

7. The system of claim 1, wherein the computing device is configured to identify the plurality of agenda actions using a language processing module.

8. The system of claim 1, wherein the sensor is configured to detect a hematological parameter.

9. The system of claim 1, wherein the agenda action is further prioritized as a function of a previous user message.

10. The system of claim 1, wherein the response to the user is generated by generating a user-action learner.

11. A method of generating a virtual assistant in a messaging user interface, the method comprising:

receiving, from a sensor, a change in a biological state of a user;

retrieving, by a computing device, at least one previous message entered by the user, wherein the at least one previous message comprises an indication of importance for at least one agenda action;

prioritizing by a computing device an agenda action of a plurality of agenda actions contained within a user list as a function of the user message the change in the biological state of the user and the indication of importance for the at least one agenda action;

initiating by the computing device, a virtual message user interface between a user client device and a computing device;

selecting by the computing device, a conversation profile for the virtual assistant, wherein the conversation profile comprises behavior that the user uses to communicate;

generating by the computing device, a communication to the user comprising the prioritized agenda action, wherein the communication is further generated as a function of the selected conversation profile, identifying a third-party device as a function of the communication; and automatedly sharing information with the third-party device as a function of the communication.

12. The method of claim 11, wherein the conversation profile comprises an affectionate communication style.

13. The method of claim 11, wherein the conversation profile comprises a direct communication style.

14. The method of claim 11, wherein the conversation profile relates to a graphic style of communication.

15. The method of claim 11, wherein the computing device identifies a third-party by using a linguistic analyzer.

16. The method of claim 11, wherein the third-party device comprises computer operated by health-related service.

17. The method of claim 11, wherein identifying the plurality of agenda actions further comprises identifying the plurality of user actions using a language processing module.

18. The method of claim 11, wherein the sensor is configured to detect a hematological parameter.

19. The method of claim 11, wherein the agenda action is further prioritized as a function of a previous user message.

20. The method of claim 11, wherein the response to the user is generated by generating a user-action learner.

\* \* \* \* \*